United States Patent [19]

Hoffman

[11] Patent Number: 5,777,562
[45] Date of Patent: Jul. 7, 1998

[54] CENTERING DEVICE AND METHOD FOR CENTERING

[76] Inventor: David J. Hoffman, 2814 W. Dale Rd., NW., Canton, Ohio 44708

[21] Appl. No.: 699,805

[22] Filed: Aug. 19, 1996

[51] Int. Cl.$^6$ .................................. G01B 7/02
[52] U.S. Cl. .................. 340/870.07; 33/644; 33/520; 340/870.04; 340/686
[58] Field of Search ............ 340/870.3, 870.07, 340/870.16, 870.04, 870.05, 870.09, 686, 680; 33/644, 520; 73/152.17; 29/406

[56] References Cited

U.S. PATENT DOCUMENTS

| | | | |
|---|---|---|---|
| 2,801,474 | 8/1957 | Field et al. | 33/178 |
| 3,167,866 | 2/1965 | Steineman | 33/172 |
| 3,307,267 | 3/1967 | Barr et al. | 33/174 |
| 3,823,482 | 7/1974 | Schiler | 33/169 R |
| 4,333,238 | 6/1982 | McMurtry | 33/174 L |
| 4,386,344 | 5/1983 | Vecchiatto | 340/680 |
| 4,409,736 | 10/1983 | Seltzer | 33/169 C |
| 4,429,463 | 2/1984 | Angell | 33/169 C |
| 4,447,956 | 5/1984 | Chung | 340/680 |
| 4,509,266 | 4/1985 | Cusack | 340/680 |
| 4,599,524 | 7/1986 | McMurtry | 307/119 |
| 4,754,551 | 7/1988 | Scott | 33/169 C |
| 4,991,306 | 2/1991 | Raiha | 33/520 |
| 5,168,638 | 12/1992 | Barton | 33/644 |
| 5,279,042 | 1/1994 | Gonzales | 33/561 |
| 5,541,588 | 7/1996 | Matsuhashi | 340/870.01 |

*Primary Examiner*—Michael Horabik
*Assistant Examiner*—Albert K. Wong
*Attorney, Agent, or Firm*—Sand & Sebolt

[57] ABSTRACT

A centering device and method includes a sensor for sensing the center of a bore preformed in a workpiece, and a remote output unit for outputting the positional signal generated by the sensor. The sensor in held within a spindle of a machine tool and includes a stylus which contacts the inner surface of the bore, a local oscillator and modulator and an RF oscillator and antenna. The stylus oscillates a linear proximity sensor. The proximity sensor outputs a proportional DC voltage which is input to a voltage controlled oscillator (VCO) which outputs a square-wave with a frequency which is a function of the stylus position. The RF oscillator and antenna includes a radio transmitter and antenna and receives the square-wave output of the VCO, converts the square-wave to a modulated RF signal and transmits the modulated RF signal to the remote output unit. The remote output unit includes an RF receiver and demodulator, and a signal processor and output and display. The RF receiver and demodulator includes an antenna for receiving the modulated RF signal and a radio receiver and demodulator which outputs a demodulated square-wave. The signal processor and output display includes a two-stage amplifier which amplifies the demodulated square-wave, a tachometer circuit which converts the frequency of the demodulated square-wave to a voltage for display on an analog meter, and an audio output circuit which outputs an audio signal with a frequency proportional to the frequency of the demodulated square-wave.

25 Claims, 4 Drawing Sheets

CENTERING DEVICE AND METHOD FOR CENTERING

BACKGROUND OF THE INVENTION

1. Technical Field

Generally, the invention relates to centering devices and methods. More particularly, the invention relates to a device and method for locating the center of a cylindrical bore or an outside edge of a cylindrical boss. Specifically, the invention relates to a device which mounts within the spindle or chuck of a milling machine, lathe, drill press or the like which spins within the bore or around the circumference of the boss and transmits a radio frequency (RF) position signal to a remote receiver which outputs the position of the device relative to the center of the bore or boss on a meter or through an audio speaker and a method for accomplishing the same.

2. Background Information

Machine tool operators often have difficulties precisely determining the center of a cylindrical bore or an outer edge of a cylindrical boss during the manufacturing of workpieces. Machine tools used for machining generally include a spindle or chuck for holding a tool bit, drill bit or cutter and a workpiece holder for holding a workpiece. The workpiece holder may be a vise or a jig and is usually slidably mounted on the machine tool and its position may be adjusted by hand cranks with graduated dials.

A problem is encountered due to the fact that it is difficult to precisely position the workpiece with respect to the spindle. The relative positioning of a tool bit held by the spindle and the workpiece is crucial to attaining accuracy and precision in performing a machining operation. For example, when an engine block is rebored, not only must the cylinders be precisely disposed but so too must the bore for the crankshaft and cam shaft. Merely reboring the hole truly cylindrical is insufficient in that if the axis of the hole is not accurately disposed, the parts when assembled may run eccentrically.

The alignment of the axis of the center of the bore to obtain precise concentricity about the desired location is difficult and time consuming even for the most skilled machinist. To a large degree this involves experience and guess work or expensive jigs to precisely hold the workpiece and the boring tool. While such equipment may be cost effective when manufacturing the workpieces initially in large production operations, the cost for remanufacturing and for smaller quantities generally is not justified and if the precision is not obtained the work is scraped.

Various centering devices exist to locate the center of a cylindrical bore or the outer edge of a cylindrical boss. For example, U.S. Pat. No. 2,801,474 discloses an apparatus for measuring the end diameter of a round bore which generally includes a tubular housing and a gage pin extending from one end of the housing and a dial indicator extending from the other end thereof. The gage pin acts as a plunger when the apparatus is pressed downwardly within a bore and the dial indicator displays the size of the bore as a function of the downward movement of the plunger.

U.S. Pat. No. 3,167,866 discloses a bore axis locating tool which generally includes a feeler finger which is rotated around the circumference of the bore by the machine tool and an indicator which displays a positional reading. When the indicator displays a constant deflection reading, exact alignment has been achieved and the locating tool is removed from the machine tool.

U.S. Pat. No. 3,307,267 discloses an apparatus for assessing the coordinates of a center of a roughly circular form. The apparatus includes a stylus for following the inner circumference of a hole and a transducer amplified via an amplifier and applied to a potentiometer which produces an output proportional to the transducer signal. This output signal is utilized to provide the coordinates of the hole relative to a fixed axis.

U.S. Pat. No. 3,823,482 discloses an inspection machine having right angle probe units which includes a probe which rotates to measure the roundness of the interior or exterior of a hole or boss, respectively.

U.S. Pat. No. 4,333,238 discloses a coordinate measurement machine which includes a probe for generating a signal and having a predetermined relationship with the workpiece. The deflection of the probe is determined by an electronic circuit which computes the difference between the measured and actual positions of the probe.

U.S. Pat. No. 4,386,344 discloses an electronic edge and center locator which includes a stylus for contacting the edge of an interior bore or the exterior surface of a boss standing proud of the primary surface. The connector extends through a horizontal bore formed in the stylus, and is electronically connected to an electronic box having a plurality of lights for indicating the position of the stylist relative to the workpiece.

U.S. Pat. No. 4,409,736 discloses a null seeking system for a remote center compliance (RCC) device which includes a detector for sensing the position of an operator mechanism of the RCC device relative to a fixed position, a threshold circuit which determines whether the operator mechanism is at a null region and a correction circuit which provides an error correction signal to maintain the null position of the operator mechanism relative to the fixed portion.

U.S. Pat. No. 4,429,463 discloses a machinist electromechanical dynamic datum point locator tool which includes a tip having a light emitting diode on the end thereof which emits light from the circumference of the cylindrical locator tool whenever the initially eccentrically placed tip of the cylindrical tool touches the edge of the workpiece.

U.S. Pat. No. 4,599,524 discloses a position-sensing apparatus having a probe which measures a work surface and which includes an electric circuit to respond to engagement between the probe and the work surface.

U.S. Pat. No. 4,754,551 discloses a centering gauge tool for determining the concentricity of an axle relative to a rotating tool. The tool preferably has four sensing fingers equally spaced about a conical core, and a plurality of LED lights, with each LED indicator light operatively communicating with a respective finger. The centering device mounted within the spindle of the rotating tool is axially aligned with the bore of the workpiece when all four LED lights light simultaneously.

U.S. Pat. No. 4,991,306 discloses a tactile center locator having a probe with a sharp point which is placed within a punch mark or pilot hole of the workpiece. The other end of the probe cooperates with two orthogonally located sensors. The sensors deflect in response to the total pivotal movement of the probe, and define the offset relationship between the workpiece and the rotating tool.

U.S. Pat. No. 5,168,638 discloses a sensor for detecting the location of a discontinuity which includes a sensing head having a probe adapted to engage the portion of the workpiece defining a hole, a housing which supports the sensing head for lateral displacement of the sensor in response to engagement of the hole by the probe, a pair of displacement conversion members which are supported in the housing and sensing devices disposed to respond to the axial displacement of each of the conversion member to generate a signal.

Although these prior art centering devices and methods are adequate for the purpose for which they were intended, these prior art devices and methods include gages, meters and indicators that are physically attached to the devices. Those devices which extend into the spindle of the machine tool rotate as the machine tool rotates making it difficult for the operator to read the gages, meters and indicators. Further, it is difficult for the operator to manually adjust the position of the workpiece while simultaneously reading the gages, meters and indicators to determine which direction the workpiece must be moved to concentrically align the machine tool and the workpiece.

Therefore, the need exists for an improved centering device and method which uses a stylus, a linear proximity sensor, and usual circuitry to generate a variable frequency wave, which is used to modulate an RF carrier. The modulated RF signal is transmitted to a remote receiver which outputs the position of the device relative to the center of the bore or boss on a meter and through an audio speaker. There is no such centering device or method of which I am aware.

SUMMARY OF THE INVENTION

Objectives of the invention include providing a centering device with a sensor which is held within the spindle of a machine tool and which outputs a RF signal, and a receiver which decodes the RF signal and outputs the position of the spindle relative to the center of a bore or boss on a meter and/or through an audio speaker.

Another objective is to provide such a device and method which allows the sensor to measure the position of the spindle and which outputs the position on a remote receiver which can be located at a position which is convenient for the operator to read or hear the positional output of the sensor relative to the center of the bore or boss.

A further objective is to provide such a device which utilizes circuitry known to those skilled in the art and arranges the circuitry in a novel manner to locate the center of a bore or boss.

A still further objective is to provide such a device which uses a linear proximity sensor that produces a varying modulation voltage when the spindle of the machine tool is not concentrically aligned with the center of the bore or boss.

Another objective is to provide such a device which utilizes a radio transmitter and a radio receiver to transmit and receive, respectively, the RF signal.

A further objective is to provide such a device and method in which the sensor can produce the modulation voltage by using a potentiometer, an involute capacitor plate or a linear variable differential transformer, as well as the linear proximity sensor.

These objectives and advantages are obtained by the improved centering device of the present invention, the general nature of which may be stated as including sensing means mounted to the machine tool adjacent the workpiece for sensing the position of the centering device relative to the workpiece; modulated signal generating means for generating a modulated signal proportionate to the position of the sensing means; oscillating means for converting the modulated signal to an oscillating signal; converting means for converting the oscillated signal to a transmittable signal; transmission means for transmitting the transmittable signals; and receiver means for receiving the transmittable signal which receiver means is positioned at a discrete location relative to the sensing means and for outputting a signal to convey the position of the workpiece relative to the machine tool.

These objectives and advantages are also obtained by the improved method for determining the concentricity of a bore about a center axis of the present invention, the general nature of which may be stated as including sensing a position of the centering device relative to the central axis; generating a modulated signal proportionate to said position; converting said modulated signal to an oscillating modulated signal; transforming said oscillating modulated signal to a modulated radio frequency signal; transmitting said modulated radio frequency signal; receiving and demodulating said modulated RF signal using a receiver, said receiver outputs an oscillating signal; and outputting said oscillating signal.

BRIEF DESCRIPTION OF THE DRAWINGS

The preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
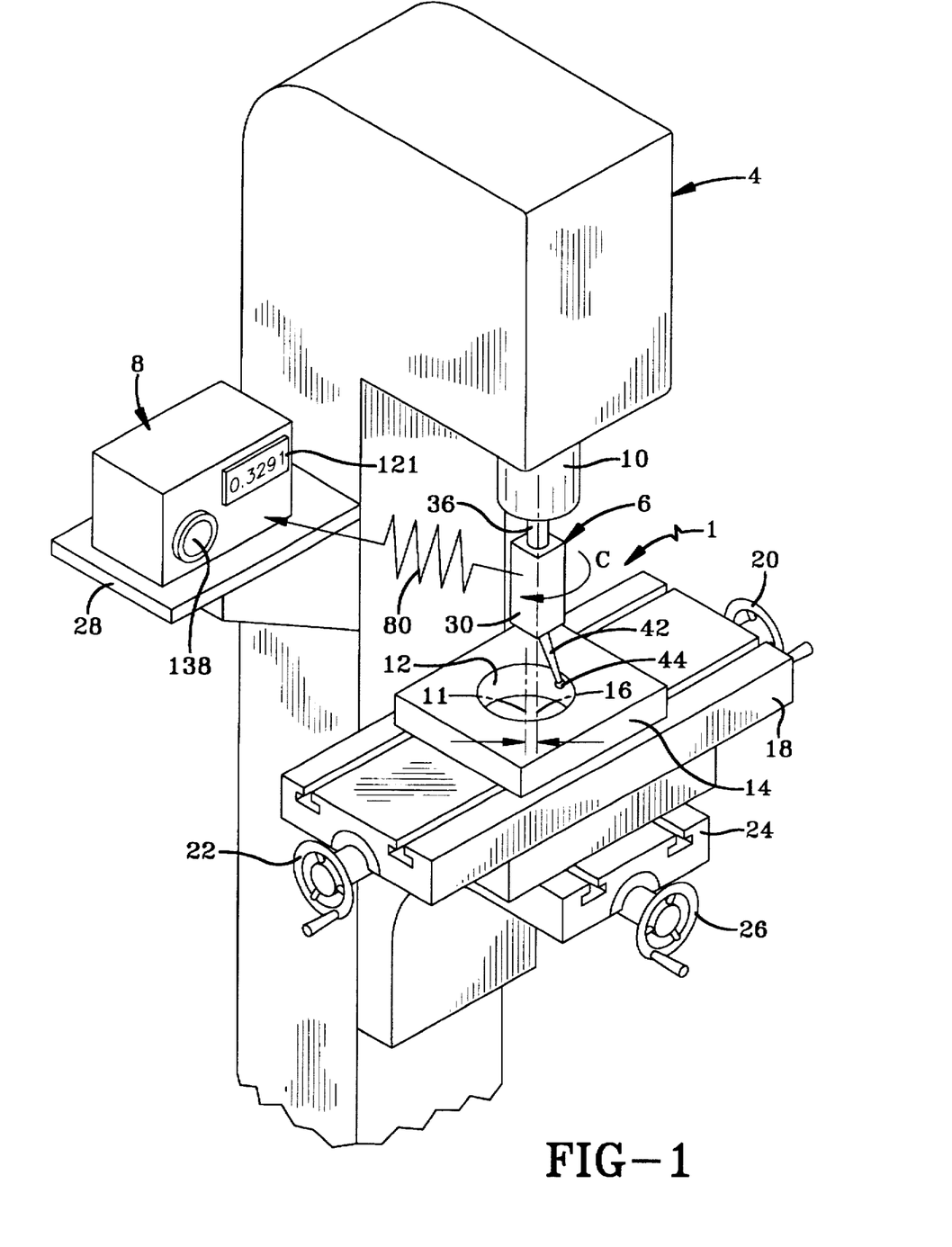
FIG. 1 is a perspective view of a usual milling machine with the centering device of the present invention being held and rotated thereby, and showing an RF signal being transmitted to a remote receiver which outputs the spindle/workpiece misalignment.

The centering device of the present invention is indicated generally at 1 in FIG. 1 and is shown attached to a usual milling machine 4. Centering device 1 generally includes a sensor 6 and a remote output unit 8. Sensor 6 is releasably retained in a chuck or spindle 10 of milling machine 4 and is used to axially align a center-line 11 of a bore 12 pre-formed in a workpiece 14 with a center-line 16 of spindle 10. Workpiece 14 is mounted on an upper carriage 18 of milling machine 4 which includes right and left adjustment wheels 20 and 22, respectively, for slidably moving upper carriage 18 in a right-left direction. Upper carriage 18 is mounted on a lower carriage 24 which includes an adjustment wheel 26 for slidably moving lower carriage 24 in a front-rear direction. Remote output unit 8 is shown mounted on a shelf 28 of milling machine 4 but may be placed in any location which would allow an operator to conveniently and easily read or hear the positional output of remote output unit 8, as described below in further detail.

Figure 4A:
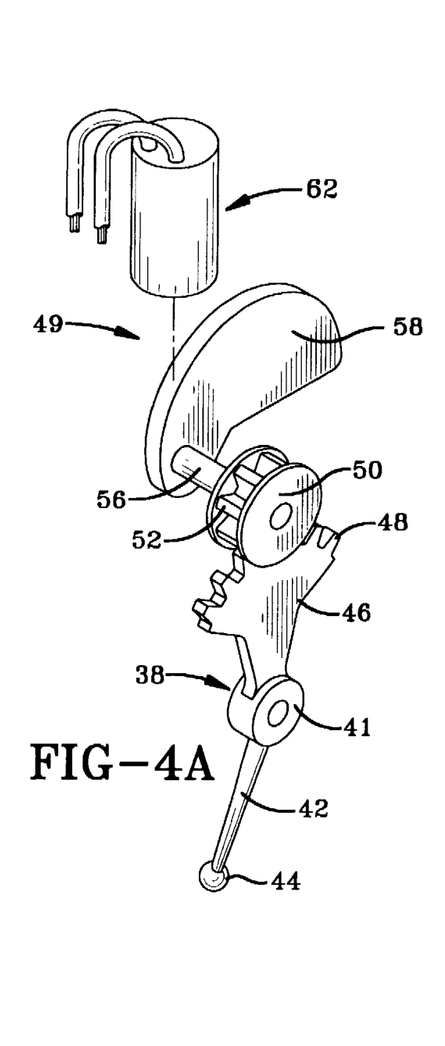
FIG. 4A is an enlarged perspective view of the stylus of the sensor of FIG. 1.

Sensor 6 has an outer housing 30 (FIG. 2) with a tapered bottom end 32, a middle body section 34 and an elongated cylindrical top stem 36. Middle body section 34 is shown in FIG. 1 in a rectangular-shaped configuration but may be of various shapes and sizes, such as a cylindrical-shape, without affecting the concept of the invention. Sensor 6 includes a proximity sensor 37 having a stylus 38 pivotally mounted to bottom end 32 of sensor 6 by a pivot pin 40 which allows stylus 38 to pivot in the direction of arrows A and B (FIG. 2), as described further below, and a modulator 49. Stylus 38 (FIGS. 2 and 4A) includes a cylindrical bushing 41, a downwardly extending tapered arm 42 having a spherical end 44, and an arcuate-shaped rack 46 having outwardly extending teeth 48. Rack 46 is operatively connected to modulator 49 which includes a circular pinion 50 having teeth 52 which engage teeth 48 of rack 46 to rotate pinion 50 about a pivot pin 54. Pinion 50 includes a cylindrical rod 56 (FIG. 4A) which extends outwardly from the center thereof. Modulator 49 includes an involute cam 58 attached to cylindrical rod 56 which rotates adjacent a linear proximity sensor 62.

Figure 2:
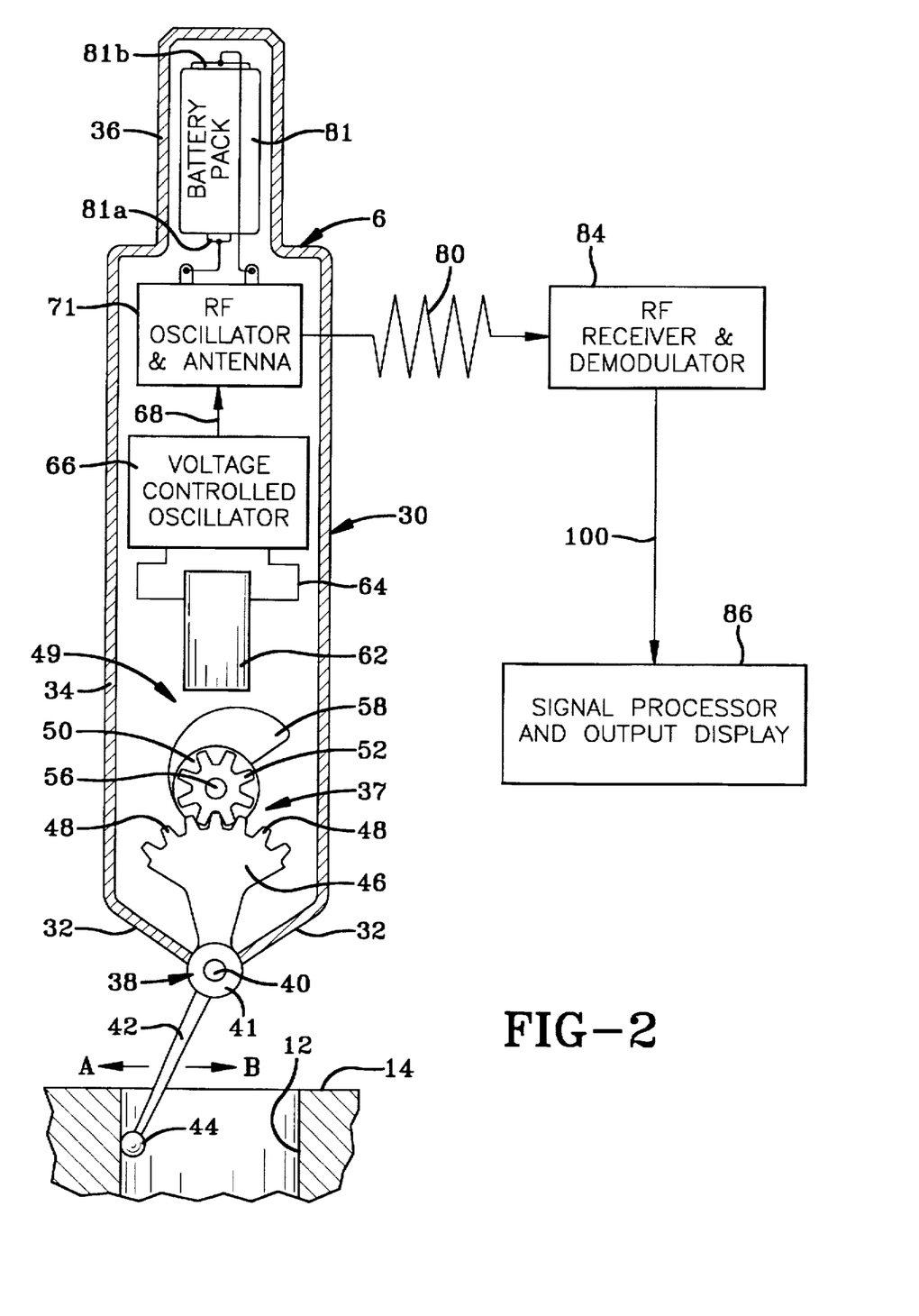
FIG. 2 is a block circuit diagram showing the electronic circuit used within the centering device of FIG. 1.

In accordance with one of the features of the invention, linear proximity sensor 62 outputs a DC voltage 64 which is proportional to the stylus position and which is used to modulate a voltage controlled oscillator 66 (FIG. 2). Voltage Controlled Oscillator (VCO) 66 (FIG. 3) includes a pair of resistors 70 and 72 and a timing capacitor 74, and outputs a square-wave periodic signal with a frequency which is a function of the proportional DC voltage 64, examples of which are shown by wave-forms 68a and 68b in dash box 69. Resistors 70 and 72 control the minimum and maximum frequencies, respectively, of square-wave 68, and timing capacitor 74 controls the free-running frequency of square-wave 68.

One of square-wave 68a and 68b is input to an RF oscillator and antenna 71 (FIG. 2) which includes a usual radio transmitter 76 (FIG. 3), and a coil antenna 78. Radio transmitter 76 is well known in the RF communications art and is of the type which includes a transistor and a plurality of various electrical components, such as resistors, capacitors and inductors, and is used to convert square-wave 68 into a modulated RF signal which is transmitted to remote output unit 8 by antenna 78. Local oscillator and modulator 65, RF modulator and antenna 71 and linear proximity sensor 62 are powered by a usual DC battery pack 81 (FIGS. 2 and 3) having positive and negative terminals 81a and 81b, respectively.

In accordance with another feature of the invention, remote output unit 8 includes an RF receiver and demodulator 84 (FIG. 2) and a signal processor and output display 86. RF receiver and demodulator 84 includes a reception antenna 82 (FIG. 3) which receives modulated RF signal 80, and a usual radio receiver and demodulator 88. Radio receiver and demodulator 88 is powered by a usual 110 volt AC source which is accessed by three pronged plug 90 and which is input to a 24 volt DC power supply 92, and is switched between ON and OFF positions by a power switch 94. When switch 94 is in the ON position, power supply 92 supplies a DC voltage to radio receiver and demodulator 88 through positive and negative terminals 96 and 98, respectively.

Radio receiver and demodulator 88 is of the type which includes a plurality of transistors and electrical components, such as resistors, capacitors and inductors, and outputs a demodulated signal 100, examples of which are shown by wave-forms 100a and 100b, to signal processor and output display 86 (FIG. 2). Signal processor and output display 86 converts demodulated signal 100 to a visual and auditory output and includes a two-stage amplifier indicated generally at 102, a tachometer circuit indicated generally at 104 and an audio output circuit indicated generally at 106.

Amplifier 102 includes a pair of first and second inverting amplifier circuits 108 and 109, respectively, connected in series, each of which includes a usual operational amplifier 110, a feedback resistor 112, a compensating resistor 114 which compensates for the offset current in operational amplifiers 110, and a source resistor 116 connected between the input to each circuit 108 and 109 and the negative input terminal of each amplifier 110.

Second inverting amplifier circuit 109 outputs an amplified demodulated square-wave 118, similar to that of demodulated signal 100 from radio receiver and demodulator 88 but with a greater amplitude, examples of which are shown by wave-forms 118a and 118b. Amplified demodulated square-wave 118 is input to tachometer circuit 104 for display on an analog meter 120 or a digital display 121 (FIG. 1). Tachometer circuit 104 includes a timer 122, a capacitor 124 connected between timer 122 and a grounded line 126, and a resistor 128 connected between a supply voltage 130 and timer 122. A potentiometer 132 is connected between an output 123 of timer 122 and the input of analog meter 120 for adjusting the output of tachometer circuit 104.

Audio output circuit 106 receives amplified demodulated square-wave-118 through an input line 134 and includes an inverting buffer 136, an 8 ohm speaker 138 which receives an output 140 of inverting buffer 136 and an ON/OFF switch 142 connected between speaker 138 and a grounded line 144.

In operation, workpiece 14 is mounted on upper carriage 18 of milling machine 4 and top stem 36 of sensor 6 extends into and is tightened within spindle 10 as shown in FIG. 1. Stylus 38 and particularly spherical end 44 of arm 42 is positioned within bore 12 of workpiece 14 (FIGS. 1 and 2). Milling machine 4 is activated by a user, rotating or spinning spindle 10 and sensor 6 in the direction of arrow C (FIG. 1) at, for example, 60 RPMs to align center-line 11 of bore 12 of workpiece 14 with center-line 16 of spindle 10. Adjustment wheels 20, 22 and 26 are used to adjust the position of carriages 18 and 24, and thus workpiece 14, based upon the output of remote output unit 8, as described below in further detail. Spherical end 44 pivots stylus 38 in the direction of arrow A (FIG. 2) causing spherical end 44 of arm 42 to contact the outer edge of bore 12 of workpiece 14. Alternatively, a spring may be utilized to urge spherical end 44 toward the outer edge of bore 12.

Figure 3:
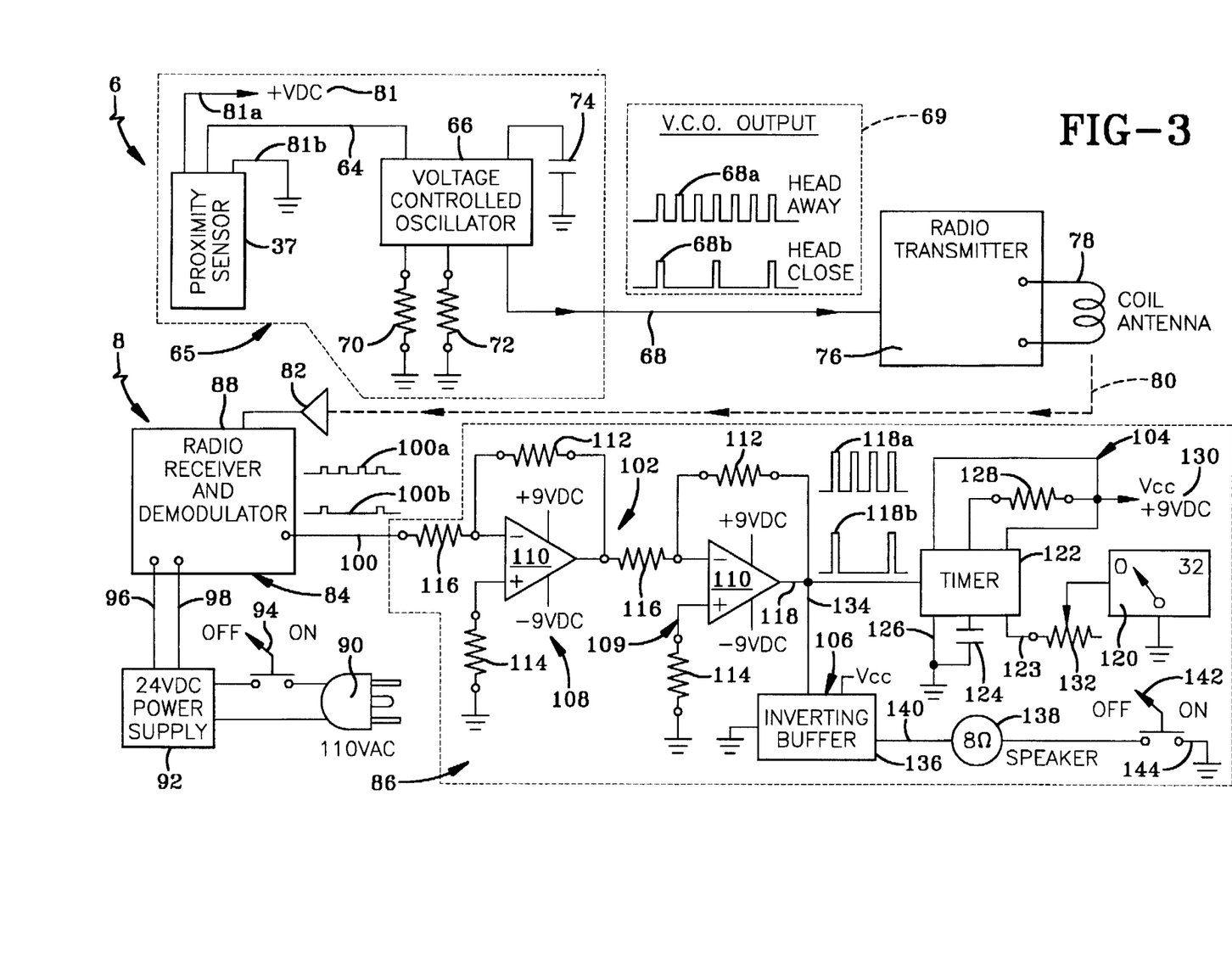
FIG. 3 is a circuit diagram showing the electronic components of the block diagram of FIG. 2.

When center-line 16 of spindle 10 and center-line 11 of bore 12 are coincident, stylus 38 will remain stationary as sensor 6 rotates in the direction of arrow C (FIG. 1). Conversely, when center-line 16 of spindle 10 and center-line 11 of bore 12 are misaligned, stylus 38 pivots or oscillates outwardly and inwardly in the direction of arrows A and B, respectively. As stylus 38 pivots around pivot pin 40, teeth 48 of rack 46 engage teeth 52 of pinion 50 whereby the linear translation of rack 46 effects rotational movement of pinion 50 and whereby the rotational movement of pinion 50 oscillates involute cam 58. The oscillating movement of involute cam 58 causes linear proximity sensor 62 to produce signal 64. Signal 64 preferably modulates within a range of 0 to +9 VDC and is input to VCO 66 which outputs square-wave 68. VCO 66 directly varies the instantaneous frequency of signal 66 in accordance with the position of sensor 6 relative to center-line 16 of spindle 10. For example, when center-line 16 of spindle 10 and center-line 11 of bore 12 are coincident, involute cam 58 will remain relatively stationary producing a relatively constant DC voltage signal 64 which is input to VCO 66. When signal 64 is constant, VCO 66 outputs a square-wave of constant frequency (FIG. 3). On the other hand, misalignment between center-line 16 of spindle 10 and center-line 11 of bore 12 produces a signal 64 with varying frequency, as described above, which causes VCO 66 to output a varying frequency square-wave.

Square-wave output 68 of VCO 66 is input to radio transmitter 76 which converts square-wave 68 to modulated RF signal 80. Modulated RF signal 80 is broadcast by coil antenna 78, propagates through the air and is received by antenna 82 of RF receiver and demodulator 84. Radio receiver and demodulator 88 demodulates RF signal 80 and recreates the original position signal from a degraded version of the transmitted signal after propagation. Radio receiver and demodulator 88 outputs demodulated signal 100 which has the same frequency but a much lower amplitude than square-wave output 68 of VCO 66, and which is indicated by demodulated wave-forms 100a and 100b which correspond to waveforms 68a and 68b, respectively.

Amplifier 102 provides a two-stage gain of demodulated signal 100 wherein first inverting amplifier circuit 108 increases the amplitude of and inverts demodulated signal 100, and second inverting amplifier circuit 109 further increases the amplitude of demodulated signal 100 and inverts signal 100 back to its original condition. The increased amplitude of amplified demodulate square-wave 118 is shown by wave-forms 118a and 118b which correspond to demodulated signals 100a and 100b, respectively, after being amplified by two-stage amplifier circuit 102.

Tachometer circuit 104 receives amplified demodulated square-wave 118 and converts the frequency thereof 118 to a voltage which can then be displayed by analog meter 120. Potentiometer 132 is scaled to the desired range of voltages that will be output by tachometer circuit 104. Amplified demodulated square-wave 118 is further input to inverting buffer 136 of audio output circuit 106. Inverting buffer 136 inverts amplified square-wave-form 118 for output to 8 ohm speaker 138 wherein speaker 138 will output a varying audio signal when center-line 16 of spindle 10 and center-line 11 of bore 12 are not coincident. The user adjusts the position of workpiece 14 using adjustment wheels 20, 22 and 26 based on the output of analog meter 120 and audio speaker 138 to align center-line 11 of bore 12 and center-line 16 of spindle 10.

Figures 4B, 4C:
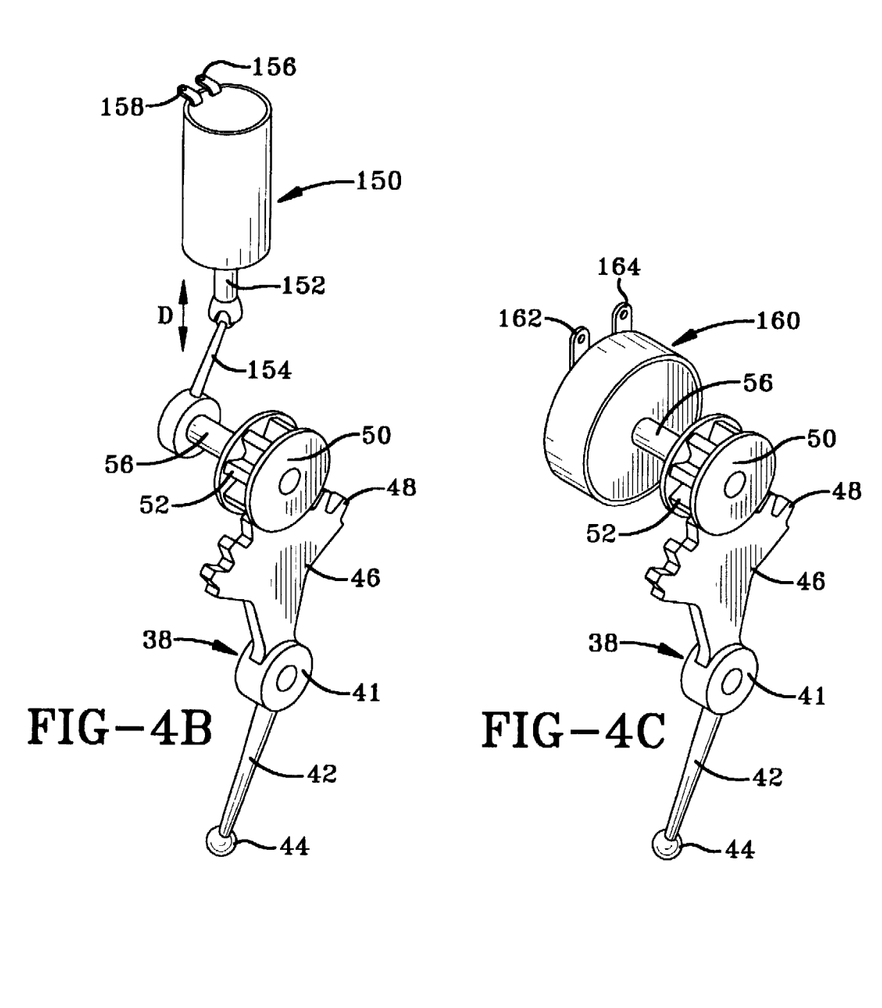
FIG. 4B is an enlarged perspective view similar to FIG. 4A showing a second embodiment of the stylus.
FIG. 4C is an enlarged perspective view similar to FIG. 4B showing a third embodiment of the stylus.

A second embodiment of proximity sensor 37 is shown in FIG. 4B and includes a modulator which is indicated generally at 150 and is of the linear variable differential transformer (LVDT) type. Modulator 150 has a variable plunger arm 152, a linkage arm 154 connected to rod 56 and output terminals 156 and 158. As pinion 50 is rotated by rack 46, as described above, linkage arm 154 oscillates sliding plunger arm 152 in the direction of arrow D and causes LVDT modulator 150 to output linear DC voltage 64 which is input to VCO 66 and is transmitted to remote output unit 8 as described above.

A third embodiment of proximity sensor 37 is shown in FIG. 4C and includes a usual potentiometer modulator, indicated generally at 160 with output terminals 162 and 164. Pinion 50 adjusts the resistance of potentiometer 160 which, in turn, varies the voltage thereacross and outputs a proportional DC voltage 64 which is input to VCO 66 and is transmitted to remote output unit 8 as described above.

It is understood that any of the above described proximity sensors can be used to generate signal 64 without departing from the spirit of the present invention. It is also understood that analog meter 120 may be replaced with various other types of meters, such as digital display 121 and an analog-to-digital converter which converts the amplified demodulated square-wave 118 to a digital signal for output on display 121, or a ladder LED having a plurality of lights which are sequentially illuminated as the centers of the spindle and bore approach coincidence. Further, centering device 1 can be used to locate the center of a usual boss by rotating a spring-biased stylus around an outer edge of a cylindrical boss and adjusting the position of the boss based on the positional output by remote output display 8.

Accordingly, sensor 6 is retained within spindle 10 of milling machine 4 and is rotated thereby. Stylus 38, and particularly spherical end 44 thereof, contacts the outer perimeter of bore 12 oscillating rack 46 and varying the voltage of signal 64. VCO 66 converts voltage 64 into modulated square-wave 68 which is transmitted by RF oscillator and antenna 71 to RF receiver and demodulator 84. Two-stage amplifier circuit 102 increases the amplitude of demodulated signal 100 and outputs amplified demodulated square wave 118 to tachometer circuit 104 and audio output circuit 106 to allow the user to adjust the position of workpiece 14 accordingly.

The voltage produced by modulator 37 is input to VCO 66 which outputs a square wave with a frequency which is directly proportional to the voltage output by linear proximity sensor 62. For example, when stylus 38 is deflected a considerable distance by bore 12 modulator 37 outputs a high voltage and VCO 66 outputs a square wave with a high frequency, such as that shown by wave-form 68a. On the otherhand, when stylus 38 is deflected a lesser distance, modulator 37 outputs a low voltage and VCO 66 outputs a square wave with a lower frequency, such as that shown by wave-form 68b. The respective square waves are input to radio transmitter 76 which modulates the waves into an RF signal which is transmitted to radio receiver and demodulator 88 which receives and demodulates the wave as described above.

Again, one of the main features of the invention is the RF transmission of the positional signal of the stylus relative to the center of bore 12, and the reception, demodulation and output of the positional signal by remote output unit 8. The above described circuitry used to accomplish these objectives may be substituted with various other types of circuitry which will produce similar results.

Accordingly, the improved centering device is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved centering device is constructed and used, the characteristics of the construction, and the advantageous, new and useful results obtained; the new and useful structures, devices, elements, arrangements, parts and combinations, are set forth in the appended claims.

I claim:

1. A centering device for determining the concentricity of a workpiece relative to a machine tool, said centering device comprising:

sensing means mounted to the machine tool adjacent the workpiece for sensing the position of the centering device relative to the workpiece;

a stylus pivotally mounted on the sensing means and having a first end which is biased outwardly away from a center axis of the workpiece, said first end of the stylus being adapted to maintain continuous contact with the workpiece while the sensing means is sensing the position of the centering device relative to the workpiece;

modulated signal generating means for generating a modulated signal proportionate to the position of the sensing means;

oscillating means for converting the modulated signal to an oscillating signal;

converting means for converting the oscillated signal to a transmittable signal;

transmission means for transmitting the transmittable signals; and receiver means for receiving the transmittable signal which receiver means is positioned at a discrete location relative to the sensing means and for outputting a signal to convey the position of the workpiece relative to the machine tool.

2. The centering device as defined in claim 1 in which the receiver means further includes reconverting means for converting the transmittable signal to a position signal; and output means for converting said position signal to one of visual and auditory output whereby said position signal is a function of the position of the sensing means.

3. The centering device as defined in claim 2 in which the stylus includes a second end operatively connected to a modulator.

4. The centering device as defined in claim 2 in which the stylus includes a spring to bias said stylus towards the workpiece.

5. The centering device as defined in claim 3 in which the first end is spherically shaped.

6. The centering device as defined in claim 2 in which the oscillating means includes a voltage controlled oscillator, whereby said voltage controlled oscillator receives the modulated signal and outputs the oscillating modulated signal.

7. The centering device as defined in claim 1 in which the transmittable signal is a radio frequency signal.

8. The centering device as defined in claim 7 in which the transmission means includes a transmitter having a transmission antenna whereby the modulated radio frequency is transmitted through said antenna.

9. The centering device as defined in claim 1 in which the receiving means further includes a reception antenna and a receiver, said reception antenna receiving the modulated radio frequency signal and forwarding it to the reconverting means.

10. The centering device as defined in claim 2 further including an amplifier circuit for amplifying the oscillating signal, whereby the amplifier circuit outputs an amplified oscillating signal.

11. The centering device as defined in claim 10 in which the amplifier circuit includes a pair of operational amplifier circuits, each of which includes an operational amplifier, a feedback resistor, an input resistor and a compensating resistor for combining to operatively create an amplified signal.

12. The centering device as defined in claim 2 in which the output means includes a tachometer circuit having a timer and a meter, said timer receiving said oscillating signal and converting the oscillating signal to a voltage signal for displaying on said meter.

13. The centering device as defined in claim 2 in which the output means includes a buffer and an audio speaker, said buffer receiving said oscillating signal and outputting said oscillating signal to said speaker.

14. A centering device for determining the concentricity of a workpiece relative to a machine tool, said centering device comprising:

sensing means mounted to the machine tool adjacent the workpiece for sensing the position of the centering device relative to the workpiece, said sensing means having a stylus with a first end adapted to contact the workpiece and a second end which includes a rack;

modulated signal generating means connected to the second end of the stylus for generating a modulated signal proportionate to the position of the sensing means, said modulated signal generating means having a pinion whereby linear translation of the rack of the sensing means effects rotational movement of the pinion;

oscillating means for converting the modulated signal to an oscillating signal;

converting means for converting the oscillated signal to a transmittable signal;

transmission means for transmitting the transmittable signals; and receiver means positioned at a discrete location relative to the sensing means for receiving the transmittable signal and for outputting a signal to convey the position of the workpiece relative to the machine tool, said receiver means including reconverting means for converting the transmittable signal to a position signal, and output means for converting said position signal to one of visual and auditory output whereby said position signal is a function of the position of the sensing means.

15. The centering device as defined in claim 14 in which the first end of the stylus spherically shaped.

16. The centering device as defined in claim 15 in which the modulator further includes translation means for translating the rotational movement of the pinion to the modulated signal.

17. The centering device as defined in claim 16 in which the translation means further includes a linear proximity sensor.

18. The centering device as defined in claim 16 in which the translation means includes a potentiometer; and in which movement of the stylus generates the modulated signal within the potentiometer.

19. The centering device as defined in claim 16 in which the translation means includes a linear differential voltage transformer; in which the linear differential voltage transformer includes a plunger mounted to the pinion, and a cylinder mounted adjacent the plunger whereby movement of the plunger into and out of the cylinder generates the modulated signal.

20. A method for determining the concentricity of a bore about a central axis including the steps of:

sensing a position of the centering device relative to the central axis using sensing means which includes a stylus pivotally mounted thereon, said stylus having a first end which is biased outwardly away from said central axis and which is adapted to maintain continuous contact with a workpiece while the sensing means is determining the concentricity of the bore about the central axis;

generating a modulated signal proportionate to said position;

converting said modulated signal to an oscillating modulated signal;

transforming said oscillating modulated signal to a modulated radio frequency signal;

transmitting said modulated radio frequency signal;

receiving and demodulating said modulated RF signal using a receiver, said receiver outputs a oscillating signal; and outputting said oscillating signal.

21. The method defined in claim 20 in which the sensing step further includes the step of rotating one of a sensing device and a workpiece, said sensing device including a stylus adapted for contacting the workpiece.

22. The method defined in claim 20 in which the generating step further includes the step of moving the stylus adjacent the workpiece thereby moving a modulator to produce a modulated signal.

23. The method defined in claim 20 further including the step of amplifying the oscillating signal to produce an amplified oscillating signal and outputting said amplified oscillating signal.

24. The method defined in claim 20 in which the outputting step further includes the step of buffering the oscillating signal to produce a buffered signal and playing the buffered signal on an audio speaker.

25. The method defined in claim 20 in which the outputting step further includes the step of converting the oscillating signal into a voltage signal using a tachometer circuit and outputting said voltage signal on a display unit.

* * * * *